Aug. 12, 1952

H. S. GILLESPIE 2,606,945

REVERSE CURRENT COMPENSATING SYSTEM

Filed April 24, 1950

INVENTOR.
HAROLD S. GILLESPIE
BY
*James M. Nickels*
ATTORNEY

Aug. 12, 1952   H. S. GILLESPIE   2,606,945
REVERSE CURRENT COMPENSATING SYSTEM
Filed April 24, 1950   2 SHEETS—SHEET 2

INVENTOR.
HAROLD S. GILLESPIE
BY James M. Nickels
ATTORNEY

Patented Aug. 12, 1952

2,606,945

UNITED STATES PATENT OFFICE 2,606,945

REVERSE CURRENT COMPENSATING SYSTEM

Harold S. Gillespie, Hasbrouck Heights, N. J., assignor to Bendix Aviation Corporation, Teterboro, N. J., a corporation of Delaware Application April 24, 1950, Serial No. 157,769

10 Claims. (Cl. 171—119)

1

The present invention relates to generator control systems and more particularly to reverse current control in a multi-generator control system.

Most generator control systems include a reverse current relay means associated with the respective generators to remove the generator from the system upon the generator voltage falling below the bus voltage. It is recognized that there is an optimum value of reverse current at which the generator should be disconnected from the bus. If the value is too low, the generator is often disconnected due to circulating currents caused by the differences in the regulator systems setting at light loads and to momentary surges. On the other hand, if the setting is too high, the contactor is required to interrupt higher currents and also may cause excessive battery drainage.

A disadvantage of some present reverse current protective systems is that the effective value of reverse current at which the relay removes the generator from the bus varies with load conditions upon the system. The extent of this variation in the effective value of reverse current depends upon the circuit constants. It is especially great in systems where the control panel and reverse current relay for the generator are located remotely from the main contactor as is the practice in most aircraft installations. The lead that carries current to the reverse current relay also may be used to carry current to or from the load equalizer coil of the voltage regulator. The current flowing in this lead causes a voltage drop therein which to some extent depends upon the load condition of the system. This variable voltage drop causes a variable voltage to be applied to the current winding of the reverse current relay for a given amount of reverse current in the generator load circuit.

The present invention provides a novel compensating circuit which changes the potential at one end of the reverse current coil by an amount equal to that caused at the other end of the coil by load conditions of the system, thus making the reverse current coil substantially independent of load conditions.

An object of the invention is to provide an improved reverse current control system.

Another object of the invention is to provide a reverse current control system that is substantially independent of load conditions.

Another object of the invention is to provide an improved generator control system.

The above and other objects and features of the invention will appear more fully hereinafter from a consideration of the following description taken in connection with the accompanying drawings wherein two embodiments of the invention are illustrated by way of example.

In the drawings:

2

Figure 1:
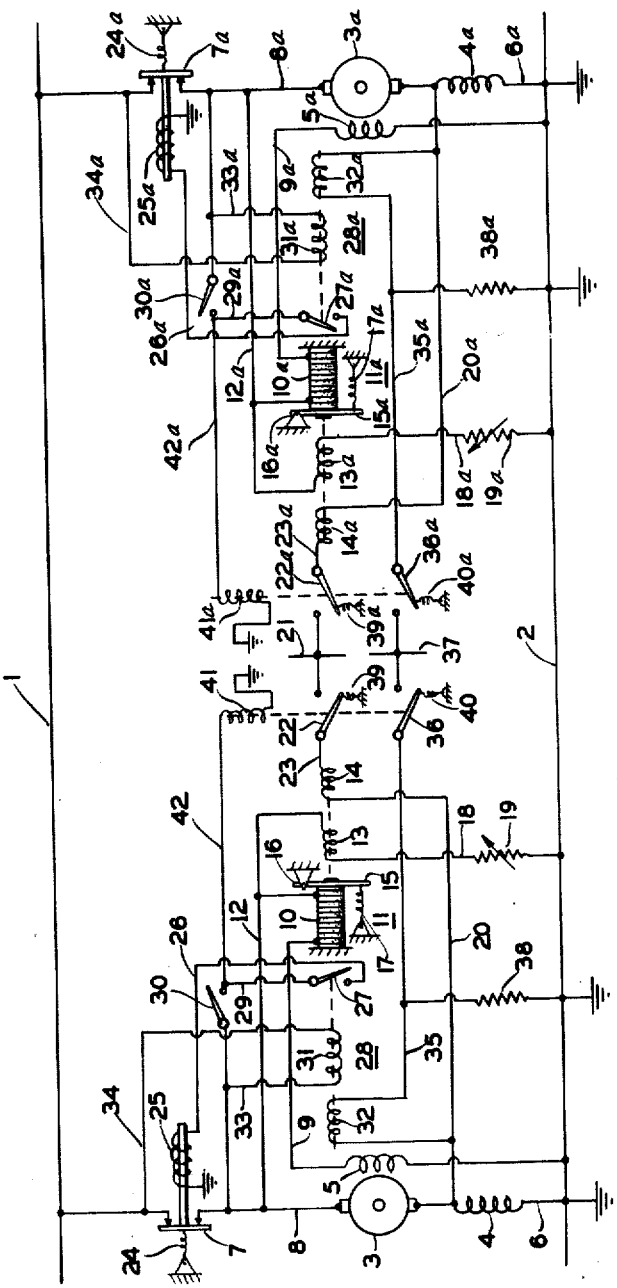
Figure 1 is a simplified schematic diagram illustrating one embodiment of the invention.

Referring now to Figure 1 of the drawing, there are shown load lines or buses 1 and 2 adapted to be supplied by a plurality of generators which may be of any suitable type. By way of example, two generators 3 and 3a are shown which may be driven by any suitable means, such as an aircraft engine (not shown).

The generator 3 has a compensating and interpole winding 4 and a shunt field winding 5. The winding 4 is connected in series with one output brush of the generator 3 and the bus 2 by a conductor 6. The other output brush of the generator 1 is connected to the bus 1 through a switch member 7 by a conductor 8. Leading from the shunt field winding 5 is a conductor 9 which in turn is connected to one end of a variable resistance carbon pile element 10 of a regulator 11. The other end of the carbon pile element 10 is connected by a conductor 12 to the output line 8.

Windings 13 and 14 provide electromagnetic means which are so arranged in the carbon pile regulator 11 as to control an armature 15 thereof and thereby the pressure applied to the carbon pile element 10. The regulator 11 is shown diagrammatically in Figure 1 as including the armature 15 pivoted at 16 and exerting a compressive force upon the carbon pile 10 under tension of a spring 17. The spring 17 is arranged so as to balance the pull on the armature 15 by the windings 13 and 14 for a predetermined output voltage. One end of the winding 13 is connected to the conductor 12. The other end of the winding 13 is connected by a conductor 18 to the output line 6. In order to permit adjustment, a variable resistor 19 is inserted in the conductor 18.

One end of the winding 14 is connected by a conductor 20 to the same brush of generator 3 as the winding 4. The other end of the winding 14 is connected to an equalizer bus 21 through a switch member 22 by conductor 23.

The switch 7 is normally biased in an open circuit position by spring 24 and is actuated to a closed position by electromagnetic winding 25. One end of the winding 25 is connected to ground. The other end of the winding 25 is connected by conductor 26 to one contact of a switch member 27 of a differential voltage and reverse current relay 28. The other contact of the switch member 27 is connected by a conductor 29 to the output line 8. A manual switch 30 may be inserted in the conductor 29.

The relay 28 is of the polarized magnetic latching type and is controlled by the electromagnetic windings 31 and 32. The winding 31 is connected across the contacts of the switch 7 by conductors 33 and 34 and is so arranged to actuate the switch member 27 to a closed position when the generator voltage is greater than the line voltage by a predetermined amount.

One end of the reverse current winding 32 is connected to the conductor 20. The other end of the winding 32 is connected by a conductor 35 through switch member 36 to a compensating bus 37. The conductor 35 is connected to ground through a compensating resistor 38.

The switch members 22 and 36 are biased in an open circuit position by springs 39 and 40 and are actuated and held in a closed position by electromagnetic winding 41. One end of the winding 41 is grounded and the other end is connected by conductor 42 to the switch 30. The winding 41 is arranged so as to actuate the switch members 22 and 36 to the closed position upon the generator voltage reaching a predetermined value.

Likewise, the generator 3a has a series winding 4a and a shunt winding 5a and is connected similarly to the generator 3. Parts in the generator 3a have been given the same reference numerals as corresponding parts in the generator 3 with the letter "a" added to distinguish therefrom and a detailed description of the generator 3a will be omitted for simplicity.

Figure 2:
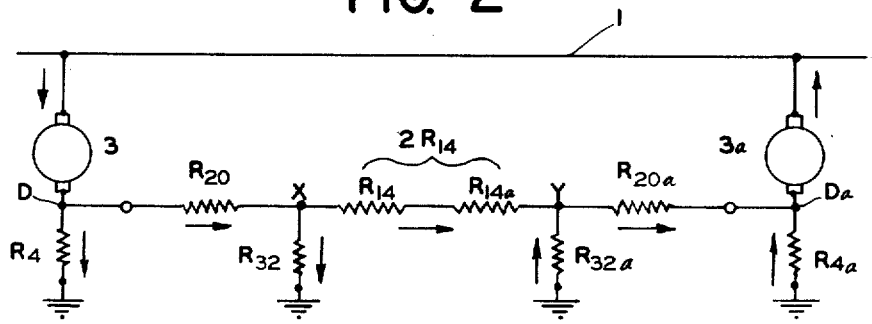
Figure 2 is a schematic diagram of a portion of a generator system reduced to a network of resistances.

For a better understanding of the invention, reference is now made to Figure 2 which illustrates the system without the compensating resistor and bus in the form of a resistance network where $R_4 = R_{4a}$ = Resistance of the generator series winding $R_{20} = R_{20a}$ = Resistance of conductor 20 between generator and panel $R_{14} = R_{14a}$ = Resistance of equalizer coil $R_{32} = R_{32a}$ = Resistance of reverse current coil For purposes of illustration, it is assumed that the generator 3 is going off the bus 1 due to reverse current. The reverse current flowing from the bus 1 back to ground through the generator 3 flows through the series winding $R_4$ and raises the potential of terminal D above ground. This causes a current to flow through the network, a portion of which will divert through $R_{32}$ and flow to ground and if of sufficient amount will cause the reverse current relay 28 to open. The current which flows through the equalizer coils $R_{14}$ and $R_{14a}$ is determined by the potential of point Da. A heavy load on the generator 3a lowers the potential of the point Da and causes it to draw more current through the equalizer coils $R_{14}$ and $R_{14a}$. This current through $R_{20}$ lowers the potential of point X and causes less current to flow through $R_{32}$. Thus the potential of point X varies due to the load being delivered by generator 3a.

Figure 3:
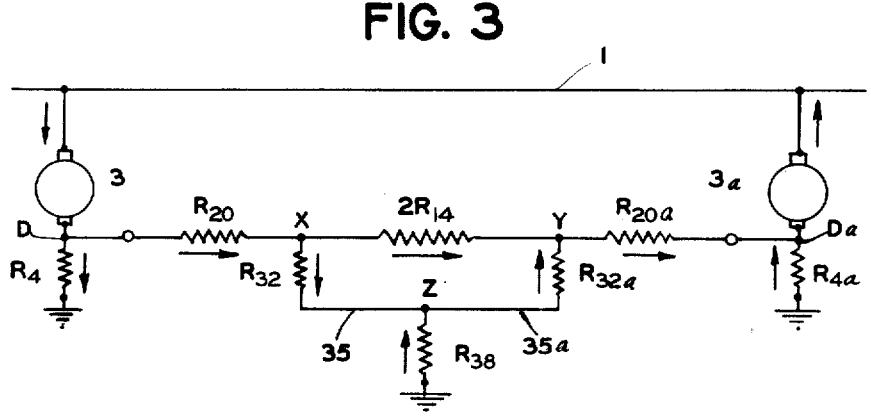
Figure 3 is a schematic diagram of a generator system reduced to a network of resistances embodying a joint compensating resistor.

Referring now to Figure 3, in which a system embodying a compensating resistor is illustrated wherein the same reference numerals have been assigned to the corresponding parts shown in Figure 2 and where the arrangement is the same, a detailed description will be omitted.

In Figure 3, the ends of the current windings 32 and 32a, represented by $R_{32}$ and $R_{32a}$, which were connected to ground in Figure 2 are now tied together by conductors 35 and 35a. The junction point of the conductors 35 and 35a are connected to ground through resister $R_{38}$. The arrows indicate the flow of current in the various parts of the circuit upon the generator 3 going off the bus due to reverse current and at the same time generator 3a is delivering a heavy load to the bus.

It is apparent that the current in $R_{38}$ is in such a direction as to lower the potential of point Z below ground potential. By selecting the proper value for the resistor $R_{38}$, the decrease in potential of point Z due to the load current flowing in generator 3a can be made equal to the decrease in potential of point X due to the load current flowing in generator 3a. Inasmuch as the network is linear, it is independent of the load. Thus, the potential across $R_{32}$ is independent of the load current in generator 3a and is responsive only to the reverse current in generator 3. Since the system is symmetrical, and the corresponding coils have equal resistances, the coil 32a is responsive to only the reverse current of the generator 3a.

By applying Kirchhoff's law to the aforenoted network and solving the resulting simultaneous equations, the correct value of $R_{38}$ is determined from the following:

$$R_8 = \frac{R_{20} \times R_{32}}{2R_{14}}$$

The aforenoted formula gives the value for a common compensating resistor for a two generator system.

It is the usual practice to embody all possible control equipment for each generator in a separate control panel which should therefore include the compensating resistor and also it is desirable to have any number of generators connected in the system. Instead of using a common compensating resistor, it is desirable to have a separate compensating resistor for each generator wherein the compensating resistance is split up in parallel paths.

Figure 4:
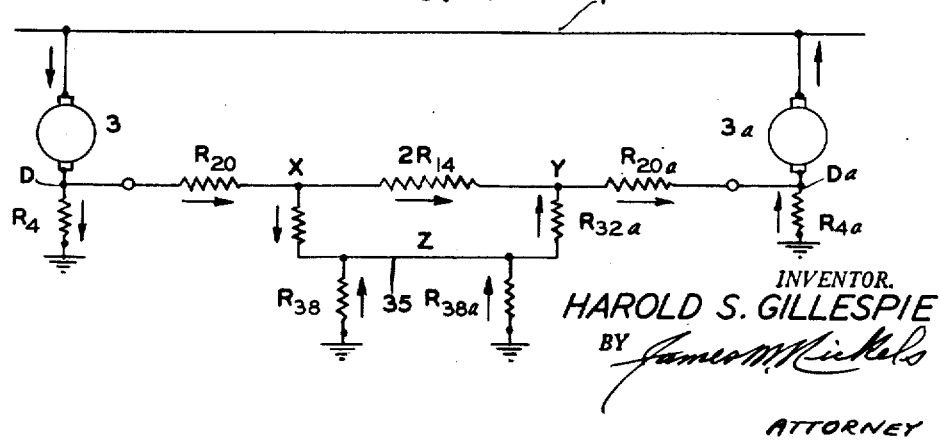
Figure 4 is a schematic diagram of a generator system reduced to a network of resistances embodying individual compensating resistors.

Figure 4 illustrates a system wherein each generator has a compensating resistor with the ends of the resistors connected to the reverse current windings tied together by the compensating bus 37. It is apparent that the value of the individual compensating resistor is twice that of the value derived from the prior formula.

The formula for the individual compensating resistor is:

$$R_{38} = \frac{R_{20} \times R_{32}}{R_{14}}$$

The resultant resistance values of the individual compensating resistors in parallel will always be the correct value to properly balance the other circuit elements regardless of the number of generators connected in the system.

Upon the equalizer coil 14 being disconnected from the system, in order to maintain the proper value of the compensating resistance, it is necessary to disconnect the associated compensating resistor from the system also. Thus, by having the winding 41 control the switch members 22 and 36, the equalizer coil 14 and compensating resistor 38 are simultaneously disconnected from the respective buses 21 and 37.

Although only two embodiments of the invention have been illustrated and described, various changes in the form and relative arrangement of the parts, which will now appear to those skilled in the art, may be made without departing from the scope of the invention.

What is claimed is:

1. A multiple generator system comprising an output line, a plurality of generators connectable to said output line, each of said generators having a field circuit, a regulator connected in said field circuit, control means for said regulator including an equalizer winding, an equalizer bus for interconnecting said equalizer windings, a reverse current relay, a reverse current winding, means including a bridge circuit having said reverse current winding as one leg thereof for interconnecting the associated reverse current windings whereby said reverse current relay is substantially independent of the load on said system.

2. In combination, a main output line, a plurality of generators, each of said generators having a field circuit, an output voltage regulator including an equalizer winding, reverse current relay means to control the connection of the associated generator to the main output line and including a reverse current winding, a compensating circuit associated with said reverse current winding including a resistor and a compensating bus for interconnecting said reverse current winding and resistor with the associated reverse current windings and resistors of the other generators, whereby said reverse current relay means are substantially independent of the load on said main output line.

3. In combination, a main output line, a plurality of generators, each of said generators having a field circuit, an output voltage regulator including an equalizer winding, an equalizer bus for interconnecting the associated equalizer windings, reverse current relay means to control the connection of the associated generator to the main output line and including a reverse current winding, a common lead from the associated generator to said equalizer winding and said reverse current winding, means including an impedance connecting the junction of said reverse current winding and said common lead to ground for compensating for the voltage drop in said lead caused by the load on said system.

4. In combination, a main output line, a plurality of generators, each of said generators having an output voltage regulator including an equalizer winding, an equalizer bus connecting said equalizer windings, reverse current relay means to control the connection of the associated generator to the main output line including a reverse current winding, a common lead from the associated generator to said equalizer winding and said reverse current winding, a compensating circuit including a resistor between said reverse current winding and ground, and a compensating bus interconnecting the resistors and reverse current windings of the associated generators.

5. The combination as described in claim 4 and including relay means responsive to the voltage of the associated generator to control the connection of the equalizer winding and compensating circuit to the equalizer bus and compensating bus respectively.

6. A multi-generator system comprising a main output line, a plurality of generators, each of said generators having an output voltage regulator including an equalizer winding, an equalizer bus for interconnecting the associated equalizer windings, reverse current relay means to control the connection of the associated generators to the main output line including a reverse current winding, conductor means for connecting said reverse current winding and said equalizer winding with the associated generator, resistance means connecting said reverse current winding to ground, a compensating bus interconnecting the junction of said resistance and said reverse current windings of the associated generators, said resistance means having a value such as to balance the resistance drop in the conductor means caused by the load on the other generators.

7. The combination as described in claim 6 and including relay means responsive to the voltage of the associated generator to disconnect said equalizer winding and said resistance means upon the voltage falling below a predetermined minimum value.

8. Control apparatus for use in a generator system having a plurality of generators connectable to an output line, each of said generators having a field circuit, a regulator connected in said field circuit, control means for said regulator including an equalizer winding, and an equalizer bus for interconnecting said equalizer windings; comprising a reverse current relay, a reverse current winding, means including a bridge circuit having said reverse current winding as one leg thereof for interconnecting the associated reverse current windings whereby said reverse current relay is substantially independent of the load on said system.

9. Control apparatus for use with a plurality of generators connectable to a main output line, each of said generators having a field circuit, an output voltage regulator including an equalizer winding; comprising reverse current relay means to control the connection of the associated generator to the main output line, a reverse current winding for said relay, a compensating circuit associated with said reverse current winding including a resistor and a compensating bus for interconnecting the said reverse current winding and resistor with the associated reverse current windings and resistors of the other generators whereby said reverse current relay means are substantially independent of the load on said main output line.

10. Control apparatus for use in system having a main output line, a plurality of generators, each of said generators having an output voltage regulator including an equalizer winding, and an equalizer bus connecting said equalizer windings; comprising reverse current relay means including a reverse current winding to control the connection of the associated generator to the main output line, a common lead from the associated generator to said equalizer winding and said reverse current winding, a compensating circuit including a resistor between said reverse current winding and ground, and a compensating bus interconnecting the resistors and reverse current windings of the associated generators.

HAROLD S. GILLESPIE.

REFERENCES CITED

The following references are of record in the file of this patent:

UNITED STATES PATENTS

| Number | Name | Date |
|---|---|---|
| 2,420,922 | Walley | May 20, 1947 |
| 2,483,117 | Almassy | Sept. 27, 1949 |
| 2,494,397 | Lusk | Jan. 10, 1950 |